(12) United States Patent
Tu et al.

(10) Patent No.: US 7,136,291 B2
(45) Date of Patent: Nov. 14, 2006

(54) CONNECTING STRUCTURE FOR A BATTERY CASE AND A MAIN BODY OF A PORTABLE ELECTRONIC DEVICE

(75) Inventors: Ying Liang Tu, Shenzhen (CN); Chia-Hua Chen, Tu-chen (TW)

(73) Assignees: Shenzhen Futaihong Precision Industrial Co., Ltd., Shenzhen (CN); Sutech Trading Limited, Tortola (VG)

( * ) Notice: Subject to any disclaimer, the term of this patent is extended or adjusted under 35 U.S.C. 154(b) by 379 days.

(21) Appl. No.: 10/848,291

(22) Filed: May 17, 2004

(65) Prior Publication Data

US 2004/0228074 A1   Nov. 18, 2004

(30) Foreign Application Priority Data

May 16, 2003   (TW) .............................. 92209068 U

(51) Int. Cl.
*H05K 7/14*   (2006.01)
*H05K 7/18*   (2006.01)

(52) U.S. Cl. ...................... 361/797; 361/801; 361/755; 455/351

(58) Field of Classification Search ................ 361/814, 361/797, 803, 755, 801–802; 455/351, 347
See application file for complete search history.

(56) References Cited

U.S. PATENT DOCUMENTS

| 4,411,419 A | * | 10/1983 | Silverman et al. ........... 271/263 |
| 5,657,210 A | * | 8/1997 | Yamanaka ................... 361/814 |
| 6,091,815 A | * | 7/2000 | Ryu et al. ............. 379/433.13 |
| 6,510,057 B1 | * | 1/2003 | Yap et al. .................... 361/752 |

* cited by examiner

*Primary Examiner*—Kamand Cuneo
*Assistant Examiner*—Hung S. Bui
(74) *Attorney, Agent, or Firm*—Wei Te Chung

(57) ABSTRACT

A connecting structure for a battery case and a main body of a portable electronic device comprises a base (1), a connecting member (2), a cover (3), a shaft (4), a spring module (5) and a cylinder (6). The base has a receiving part (163) and a recessed portion (194). A hinge (22) is formed on one end of the connecting member. The cover has a track (322) and the connecting member can slide along the track. The connecting member is connected to the cylinder, and the shaft extends through the cylinder and is received in the receiving part of the base.

12 Claims, 6 Drawing Sheets

CONNECTING STRUCTURE FOR A BATTERY CASE AND A MAIN BODY OF A PORTABLE ELECTRONIC DEVICE

BACKGROUND OF THE INVENTION

1. Field of the Invention

This invention relates in general to portable electronic devices, and more specifically to a connecting structure for a battery case and a main body of a portable electronic device. This application relates to a contemporarily filed application with an unknown serial number, titled "CONNECTOING STRUCTURE FOR A FLIP COVER BATTERY COMPARTMENT OF A PORTABLE ELECTRONIC DEVICE", and having the same inventors and the same assignee with the instant application.

2. Prior Art

Portable electronic devices, such as mobile phones and personal digital assistants, are in widespread use around the world. These devices rely on batteries for power, with a battery being disengagably received in a main body of the device.

For example, an Alcatel OT310 style mobile phone has a pair of holders at an end of a battery case thereof, and a pin at an opposite end of the battery case. Complementary to the battery case, the mobile phone has a pair of slots at an end of a main body thereof, and a hole at an opposite end of the main body. In attaching the battery case to the main body, the holders are received in the slots and the pin is inserted into the hole. The battery case is thus reliably attached to the main body. However, it is difficult and inconvenient for the user to detach the battery case from the main body.

Furthermore, the battery case is completely separated from the main body when the user changes the battery of the mobile phone. The battery case is liable to be misplaced or accidentally damaged.

A need therefore exists for a new connecting structure for a battery case and a main body of a mobile phone.

SUMMARY OF THE INVENTION

Accordingly, an object of the present invention is to provide a connecting structure for a battery case and a main body of a portable electronic device, so that a user can conveniently change a battery of the device and not risk misplacing the battery case.

Accordingly, in one aspect of the present invention, a connecting structure for a battery case and a main body of a mobile phone comprises: a base, a connecting member, a shaft, a battery case, and a cylinder. The base has a space for receiving the shaft. The connecting member has a hinge. The shaft runs through the cylinder. The battery case has a pair of tracks, and the connecting member can slide along the tracks.

Other objects, advantages and novel features of the present invention will be drawn from the following detailed description of a preferred embodiment of the present invention together with the attached drawings, in which:

DETAILED DESCRIPTION OF THE INVENTION

Figure 1:
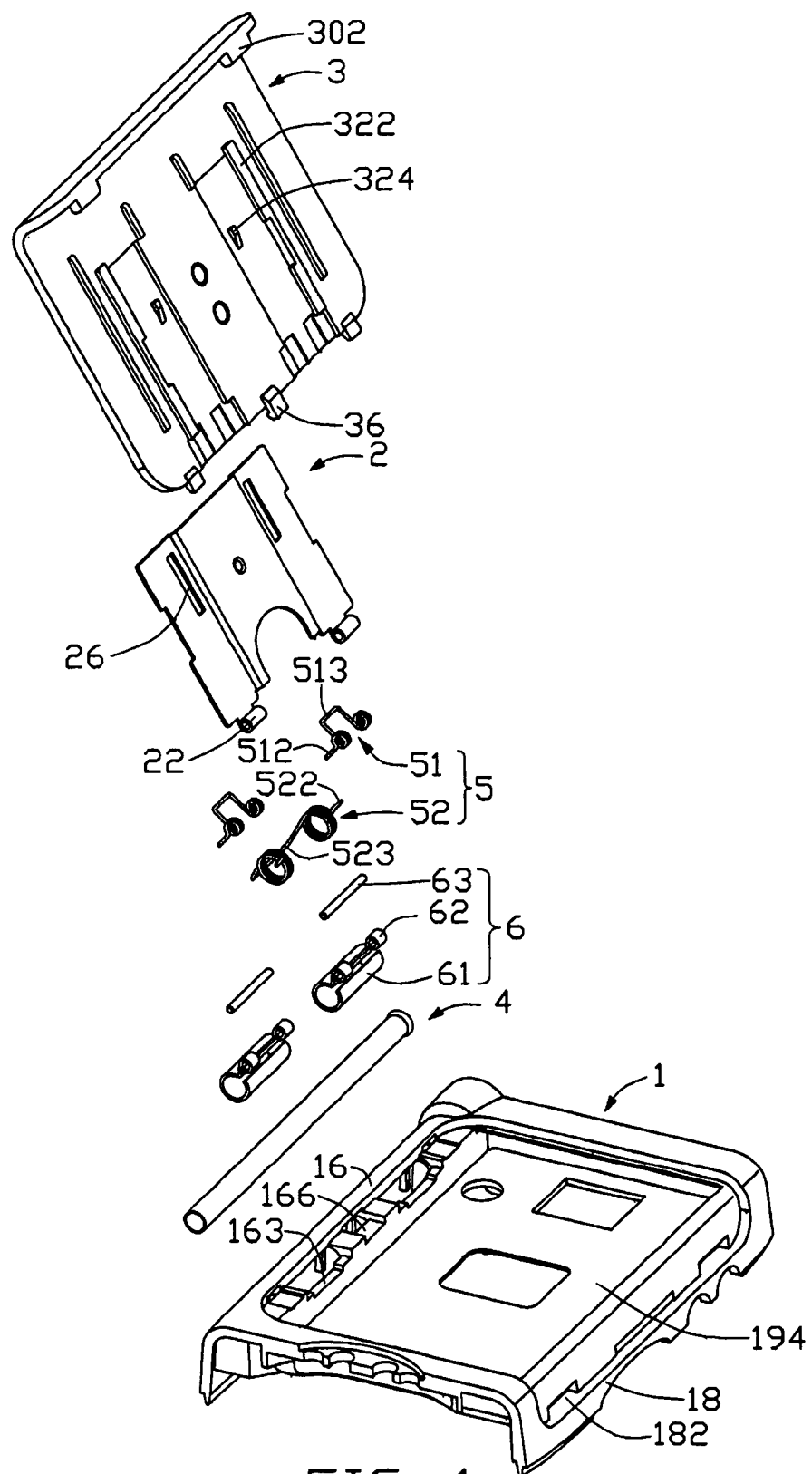
FIG. 1 is an exploded, isometric view of a connecting structure of the present invention.
Figure 2:
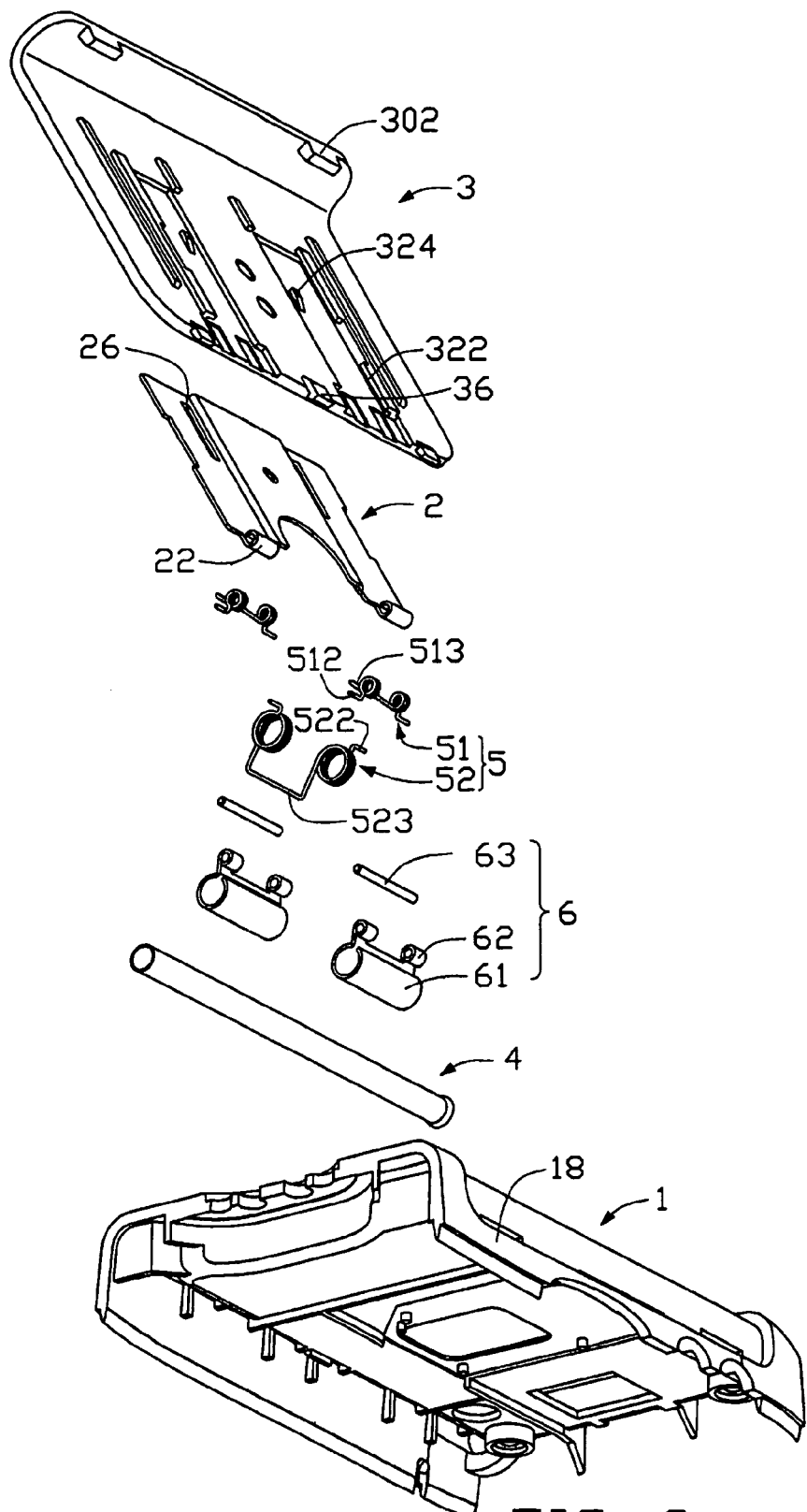
FIG. 2 is similar to FIG. 1, but viewed from another aspect.

Referring to FIG. 1 and FIG. 2, a connecting structure for a battery case and a main body of a portable electronic device comprises a base 1, a connecting member 2, a cover 3, a shaft 4, a spring module 5 and a cylinder module 6.

The base 1 has a recessed portion 194 for receiving a battery (not shown) of the portable electronic device. A left sidewall 16 of the base 1 has a receiving part 163 and a plurality of grooves 166, and the shaft 4 is received in the receiving part 163. A right sidewall 18 of the base 1 has two notches 182.

The connecting member 2 has two parallel slots 26. A pair of aligned hinges 22 is formed on one end of the connecting member 2.

Figure 5:
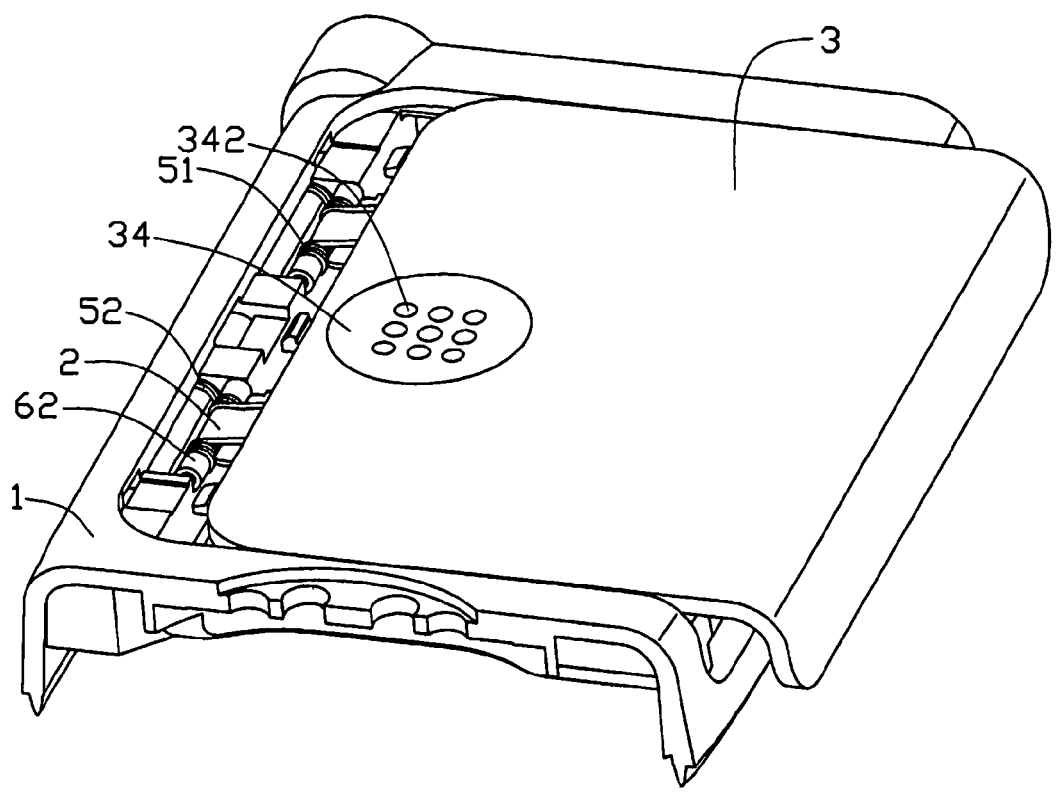
FIG. 5 is similar to FIG. 3, but showing the cover in a partly closed position.

Referring also to FIG. 5, the cover 3 has two spaced projections 302, two parallel tracks 322, two guiding projections 324, a press portion 34 and a plurality of holders 36. The connecting member 2 can slide along the tracks 322. The guiding projections 324 are slidably received in the slots 26 of the connecting member 2. The projections 302 are formed on one end of the cover 3. When the cover 3 is completely closed, the projections 302 of the cover 3 are held in the notches 182 of the base 1. The holders 36 are received in the grooves 166 of the base 1. The press portion 34 is formed on an outer surface of the cover 3, and has a plurality of protrusions 342.

The spring module 5 comprises a first spring 52 and a pair of second springs 51. The first spring 52 has a central arm 523, and an end 522 retained to the cylinder module 6. The second spring 51 has a central arm 513 and an end 512. The cylinder module 6 includes a pair of cylinders 61 and a pair of pins 63. Each cylinder 61 has a pair of aligned hinges 62.

Figure 3:
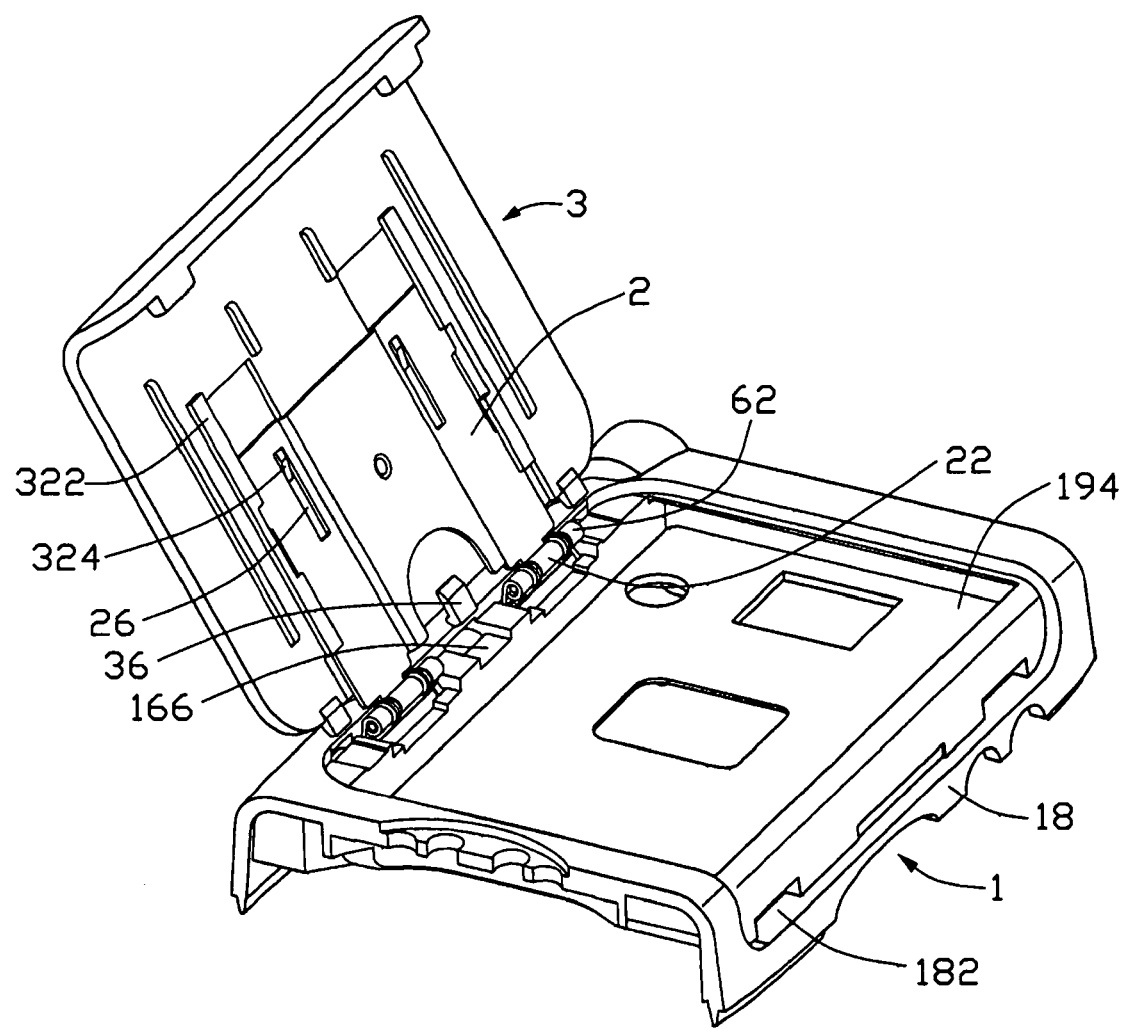
FIG. 3 is an assembled view of FIG. 1, showing a cover thereof in an open position.
Figure 4:
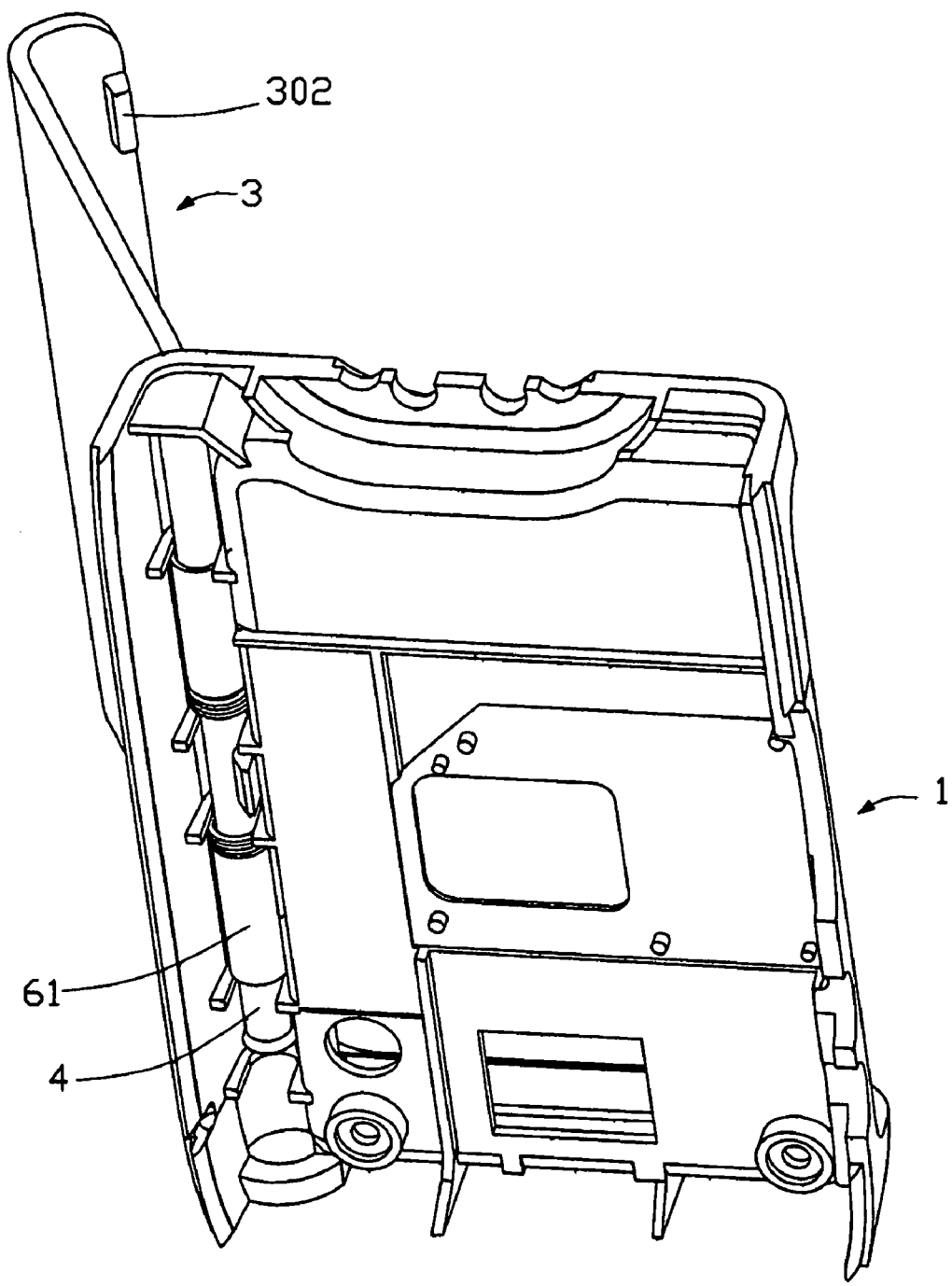
FIG. 4 is similar to FIG. 3, but viewed from another aspect.

Referring also to FIG. 3 and FIG. 4, in assembly, the connecting member 2 is held by the tracks 322 of the cover 3. At the same time, the guiding projections 324 of the cover 3 are received in the slots 26 of the connecting member 2, such that the connecting member 2 can slide along the tracks 322 of the cover 3 and the guiding projections 324 can slide along the slots 26. The pins 63 are received through the hinges 62 and the second springs 51. The arms 513 contact tops of the hinges 22, and the ends 512 are engaged with the cylinder module 6. The shaft 4 is received through the cylinders 61 and the first spring 52 in the receiving part 163 of the base 1.

Figure 6:
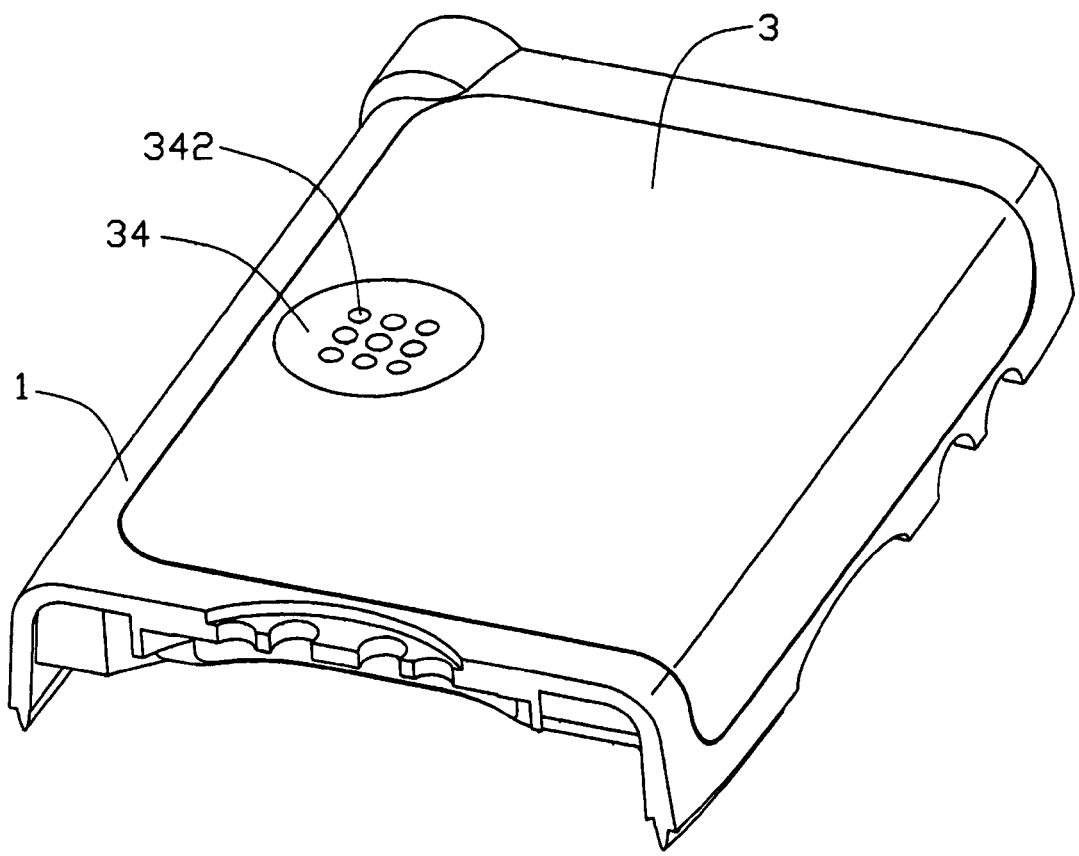
FIG. 6 is similar to FIG. 5, but showing the cover in a fully closed position.

When the cover 3 is open, a user can load a battery (not shown) into the recessed portion 194 of the base 1. Then the cover 3 and the connecting member 2 are rotated about the shaft 4 down to the base 1. At the same time the spring module 5 is compressed. When the cover 3 is parallel to the base 1 (see FIG. 5), the user can push the press portion 34 toward the shaft 4. The projections 302 of the cover 3 are then engagingly received in the notches 182 of the base 1 (see FIG. 6).

When the user wants to change the battery, he/she can linearly move the cover 3 to have the projections 302 disengaged from the notches 182. The cover 3 then rotates to the open position under force of the spring module 5 (see FIG. 6). One feature of the invention is to provide a primary/large pivotal axis which is defined by the cylinder 61 or the shaft 4, and a secondary/small pivotal axis which is defined by the hinge 62 or the pin 63 and is rotatable relative to the main pivotal axis 61, wherein the cylinder 61 and the hinge 61 are respectively equipped with springs 52, 51 thereabouts to respectively abut against the base 1 and the connecting member 2 so that the rotatable operation of the connecting member 2 with regard to the base 1 is delicate, smooth and convenient. That is, the pin 63 is somewhat located in different radial positions with regard to the shaft 4 when the connecting member 2 is in the different open and closed positions. On the other hand, when the connecting member 2 is in the closed position, the second spring 51 experiences a forward/clockwise torsion while the first spring 52 experiences a rearward/counterclockwise torsion.

It is to be noted that the detailed description provided above should be viewed as being exemplary of the invention, and not as being restrictive of the invention as claimed herebelow.

What is claimed is:

1. A connecting structure for a battery case and a main body of a portable electronic device, comprising:
   a base, having a receiving part and having a recessed portion for receiving a battery;
   a connecting member, a hinge formed at a first end of the connecting member;
   a cover having a track;
   a shaft received in the receiving part;
   a cylinder having a through hole therein;
   wherein the connecting member is connected to the cylinder, the shaft extends through the through hole of the cylinder and is received in the receiving part of the base, and the connecting member can slide along the track;
   wherein a side wall of the base has a plurality of grooves, and the cover further has a plurality of holders engagingly received in the grooves;
   wherein a projection is formed on the cover;
   wherein a side wall of the base defines a notch; and
   wherein the projection of the cover is held in the notch of the base when the battery case is completely closed.

2. The connecting structure of claim 1, wherein a guiding projection is formed on a first surface of the cover, the connecting member defines a slot, and the guiding projection is slidably received in the slot.

3. The connecting structure of claim 2, wherein a press portion is formed on a second surface of the cover, and the press portion has a plurality of protrusions.

4. The connecting structure of claim 1, wherein a pin connects the cylinder and the connecting member.

5. The connecting structure of claim 4, wherein the pin extends through a hinge of the cylinder and the hinge of the connecting member.

6. The connecting structure of claim 1, wherein a spring module defining two coil spring sections with two different respective rotation axes and with two different abutment sections respectively abutting against the connecting member and the base.

7. The connecting structure of claim 6, wherein said two coil spring sections are discrete from each other.

8. A connecting structure comprising:
   a base;
   a connecting member moveable relative to the base in open and closed positions;
   a rotation mechanism including a cylinder and a hinge immoveable relative to each other, said cylinder defining a primary rotation axis, and said hinge defining a secondary rotation axis about which the connecting member is rotatable, said cylinder and said hinge positioned around a common edge of said base and said connecting member;
   a spring module including:
   a first biasing section retained to the rotation mechanism with one end abutting against the base;
   a second biasing section retained to the rotation mechanism with one end abutting against the connecting member;
   wherein both said first biasing section and said second biasing section are in a deformed manner when said connecting member is in a closed position with regard to the base;
   wherein said first biasing section and said second biasing section are discrete from each other;
   wherein the secondary axis are located at different radial positions when said connecting member is located at respective open and closed positions; and
   wherein when said connecting member is in the closed position, the first biasing section experiences one of a clockwise torsion and a counterclockwise torsion while the second biasing section experiences the other of the clockwise torsion and the counterclockwise torsion.

9. The connecting structure of claim 8, wherein both said first biasing section and said second biasing section are in a torsion manner.

10. The connecting structure of claim 9, wherein both said first biasing section and said second biasing section are in a compress manner.

11. The connecting structure of claim 8, further including a cover attached to the connecting member and linearly moveable relative thereto to prevent rotation of the connecting member from the closed position to the open position.

12. A connecting member comprising:
   a base;
   a connecting member moveable relative to the base in opposite open and closed positions;
   a rotation mechanism located around a common edge of said base and said connecting member and defining a primary rotation axis, and a secondary rotation axis about which the connecting member is rotatable;
   a spring module including:
   a first biasing section retained to the rotation mechanism with one end abutting against the base;
   a second biasing section retained to the rotation mechanism with one end abutting against the connecting member;
   wherein both said first biasing section and said second biasing section are in a deformed manner when said connecting member is in a closed position with regard to the base; and
   a cover attached to the connecting member and linearly moveable relative thereto prevent rotation of the connecting member from the closed position to the open position.

* * * * *